(12) United States Patent
Chamberlain

(10) Patent No.: US 7,269,284 B2
(45) Date of Patent: *Sep. 11, 2007

(54) METHOD AND APPARATUS USING DUAL BOUNDING BOXES AS DYNAMIC TEMPLATES FOR CARTRIDGE RACK IDENTIFICATION AND TRACKING

(75) Inventor: Lyle Joseph Chamberlain, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 962 days.

This patent is subject to a terminal disclaimer.

(21) Appl. No.: 09/961,237

(22) Filed: Sep. 20, 2001

(65) Prior Publication Data

US 2003/0053694 A1    Mar. 20, 2003

(51) Int. Cl.
*G06K 9/46* (2006.01)

(52) U.S. Cl. .......................... 382/190; 360/69; 360/92; 382/103; 382/318

(58) Field of Classification Search ........... 348/333.06, 348/333.11, 373; 360/69, 92, 31, 74.1; 382/190, 382/199, 306, 390, 103, 318; 414/932; 711/111
See application file for complete search history.

(56) References Cited

U.S. PATENT DOCUMENTS

| | | |
|---|---|---|
| 3,831,197 A | 8/1974 | Beach et al. |
| 4,305,130 A | 12/1981 | Kelley et al. |
| 4,373,804 A | 2/1983 | Pryor et al. |
| 4,481,592 A | 11/1984 | Jacobs et al. |
| 4,539,703 A | 9/1985 | Clearman et al. |
| 4,707,647 A | 11/1987 | Coldren et al. |
| 4,737,845 A | 4/1988 | Susuki et al. |
| 4,738,025 A | 4/1988 | Arnold |
| 4,937,690 A | 6/1990 | Yamashita et al. |
| 4,945,429 A | 7/1990 | Munro et al. |
| 4,979,135 A | 12/1990 | Moy |
| 5,034,904 A | 7/1991 | Moy |
| 5,164,909 A | 11/1992 | Leonhardt et al. |
| 5,219,258 A | 6/1993 | Yeakley |
| 5,280,179 A | 1/1994 | Pryor et al. |

(Continued)

*Primary Examiner*—Gregory Desire
(74) *Attorney, Agent, or Firm*—David W. Lynch; Chambliss, Bahner & Stophel PC

(57) ABSTRACT

A method and apparatus using dual bounding boxes as dynamic templates for cartridge rack identification and tracking is disclosed. An imaging tape cartridge picker system includes a picker assembly, illumination sources disposed at the front of the picker assembly for illuminating an object, an imager disposed on the front of the picker assembly for gathering image data of the object and a processor, coupled to the imager and illumination sources, for thresholding the image data obtained from the imager and for controlling the illumination sources, wherein the processor uses bounding boxes to identify the location of a desired physical feature in the thresholded image. The processor identifies the location of the desired physical feature using the bounding boxes by finding a vertical feature of the desired physical feature by finding a valid vertical bounding box, determining whether a valid vertical feature is found, using the valid vertical feature as a reference point for the search for the horizontal feature and finding a valid horizontal bounding box of the desired physical feature when a vertical feature is positively identified, determining whether a valid horizontal feature is found and identifying a top-left intersection of the vertical and horizontal bounding boxes with the bottom-right corner of the desired physical feature when a valid horizontal feature is found.

22 Claims, 13 Drawing Sheets

U.S. PATENT DOCUMENTS

| | | |
|---|---|---|
| 5,297,238 A | 3/1994 | Wang et al. |
| 5,384,647 A | 1/1995 | Fukushima |
| 5,416,914 A | 5/1995 | Korngiebel et al. |
| 5,579,444 A | 11/1996 | Dalziel et al. |
| 5,686,960 A * | 11/1997 | Sussman et al. ......... 348/218.1 |
| 5,693,953 A | 12/1997 | Pryor et al. |
| 5,737,217 A | 4/1998 | Nishikawa et al. |
| 5,767,525 A | 6/1998 | Pryor et al. |
| 5,774,301 A | 6/1998 | Manes et al. |
| 5,786,602 A | 7/1998 | Pryor et al. |
| 5,811,827 A | 9/1998 | Pryor et al. |
| 5,835,684 A | 11/1998 | Bourne et al. |
| 5,878,151 A | 3/1999 | Tang et al. |
| 5,883,864 A * | 3/1999 | Saliba ........................ 360/92 |
| 5,889,926 A | 3/1999 | Bourne et al. |
| 5,909,504 A | 6/1999 | Whitman |
| 5,917,548 A * | 6/1999 | McIntyre ............... 348/333.06 |
| 6,504,671 B2 * | 1/2003 | Iwabuchi ..................... 360/92 |
| 6,552,868 B1 * | 4/2003 | Suzuki ........................ 360/92 |
| 6,693,758 B2 * | 2/2004 | Patterson et al. ............. 360/69 |
| 6,766,412 B2 * | 7/2004 | Bolt ........................... 711/111 |
| 6,778,700 B2 * | 8/2004 | Karidi et al. ............... 382/176 |
| 6,980,692 B2 * | 12/2005 | Chamberlain ............... 382/170 |
| 7,111,781 B2 * | 9/2006 | Fletcher ...................... 235/385 |
| 2003/0053691 A1 * | 3/2003 | Chamberlain ............... 382/170 |
| 2003/0053694 A1 * | 3/2003 | Chamberlain ............... 382/190 |
| 2003/0053715 A1 * | 3/2003 | Chamberlain ............... 382/294 |
| 2005/0030662 A1 * | 2/2005 | Bui et al. ..................... 360/48 |

* cited by examiner

METHOD AND APPARATUS USING DUAL BOUNDING BOXES AS DYNAMIC TEMPLATES FOR CARTRIDGE RACK IDENTIFICATION AND TRACKING

BACKGROUND OF THE INVENTION

1. Field of the Invention

This invention relates in general to automated tape library systems, and more particularly to a method and apparatus using dual bounding boxes as dynamic templates for cartridge rack identification and tracking.

2. Description of Related Art

Magnetic tape has long been used as a storage media for audio, video and computer information. Tape cartridges have been used extensively because they provide a convenient way to house and support a length of magnetic tape for engagement by a transducer in a tape drive while protecting the tape upon removal of the cartridge.

Storage libraries provide large capacity secondary storage to modern computing requirements. Such storage libraries typically employ robotic control mechanisms used by a host computer to physically manage tape media cartridges. A plurality of tape cartridges are stored within a storage library. Each tape cartridge is in a particular slot in the storage library. Each slot is identifiable by its physical position in the storage library. Each tape cartridge is typically uniquely identified by a machine readable label. The storage library maintains inventory information to associate a particular tape cartridge with a particular slot in the storage library. Responsive to a host computer request, a robotic mechanism or picker physically retrieves an appropriate tape cartridge from its associated slot in the storage library, moves the tape cartridge to an appropriate read/write device for processing, and inserts the tape cartridge into the device.

The robotic mechanism typically includes a hand or gripper mechanism positioned on a movable arm. To retrieve a tape cartridge, the arm moves to position the gripper near the slot holding the desired tape cartridge. The gripper then extends and grips the tape cartridge and retracts to take the tape cartridge out of the slot. The arm with the hand gripping the tape cartridge moves to the device and the hand then extends and inserts the tape cartridge into the device. Conversely, when the use of the tape cartridge is complete, the robotic mechanism retrieves the tape cartridge from the read/write device, moves the tape cartridge adjacent its associated slot according to the inventory maintained by the storage library, and inserts the tape cartridge into the storage slot of the storage library ready for future use in response to another host computer request.

A problem with prior automated storage libraries designs which contributed to their relatively higher complexity and resultant higher costs relates to the multiplicity and complexity of various sensing mechanisms used to sense several parameters of the operating storage library. Picker registration has proven to be a problem, resulting in occasional dropped cartridges and decreased system performance. Past registration techniques made of a "flying spot" paradigm, using an LED retroreflective sensor to locate the position of a few fiducial marks and then calculate the theoretical position of every cartridge cell in robot coordinates to initialize its position table. In practice this method has been less than perfect, with some systems suffering jams or drops. Other techniques have used a dedicated vision processor and bulky CCD camera with incandescent lighting. However, the production cost of such a system is high.

In order for certain vision systems to work correctly, an image is thresholded to delineate the image attributes that the system is searching for. To positively identify the position of the accessor (picker) with relation to the cartridge rack, prior methods have either used expensive imagers and/or special fiducial markings. However, expensive imaging is undesirable because of cost constraints on library systems. In addition, it is undesirable to modify the mechanical cartridge/magazine system to be viewed thereby reducing cartridge storage density and in turn library system storage capacity. The use of fiduciary markings also increases the complexity of the cartridge rack hardware and reduces the usability of the vision system.

It can be seen that there is a need for a method and apparatus that provides for cartridge rack identification and tracking without modification of the mechanical cartridge/magazine system.

SUMMARY OF THE INVENTION

To overcome the limitations in the prior art described above, and to overcome other limitations that will become apparent upon reading and understanding the present specification, the present invention discloses a method and apparatus using dual bounding boxes as dynamic templates for cartridge rack identification and tracking.

The present invention solves the above described problems by identifying key pre-existing elements of the cartridge slot features. Consequently, every cell can be calibrated, and no X-Y area is consumed for a fiducial mark, so cartridge storage can be maximally packed in a given wall area, which in turn maximizes library system storage capacity and simplifies magazine mold design.

A system in accordance with the principles of the present invention includes a picker assembly, illumination sources disposed at the front of the picker assembly for illuminating an object, an imager disposed on the front of the picker assembly for gathering image data of the object and a processor, coupled to the imager and illumination sources, for thresholding the image data obtained from the imager and for controlling the illumination sources, wherein the processor uses bounding boxes to identify the location of a desired physical feature in the thresholded image.

Other embodiments of a system in accordance with the principles of the invention may include alternative or optional additional aspects. One such aspect of the present invention is that the processor identifies the location of the desired physical feature using the bounding boxes by finding a vertical feature of the desired physical feature by finding a valid vertical bounding box, determining whether a valid vertical feature is found, using the valid vertical feature as a reference point for the search for the horizontal feature and finding a valid horizontal bounding box of the desired physical feature when a vertical feature is positively identified, determining whether a valid horizontal feature is found and identifying a top-left intersection of the vertical and horizontal bounding boxes with the bottom-right corner of the desired physical feature when a valid horizontal feature is found.

Another aspect of the present invention is that the desired physical feature comprises a top left intersection in a bottom-right corner of a vertical and horizontal member of a cartridge cell within a tape library system.

Another aspect of the present invention is that the position of the intersection relative to the imager is used to calibrate the physical position of the picker assembly.

In another embodiment of the present invention, a method for use in aligning a tape cartridge picker with cartridges in cells of a tape cartridge magazine is provided. The method includes illuminating an object with an illumination source, gathering image data for the illuminated object and processing the image data by using bounding boxes to identify the location of a desired physical feature in the thresholded image.

Another aspect of the method of the present invention is that the processing the image data by using bounding boxes further includes finding a vertical feature of the desired physical feature by finding a valid vertical bounding box, determining whether a valid vertical feature is found, using the valid vertical feature as a reference point for the search for the horizontal feature and finding a valid horizontal bounding box of the desired physical feature when a vertical feature is positively identified, determining whether a valid horizontal feature is found and identifying a top-left intersection of the vertical and horizontal bounding boxes with the bottom-right corner of the desired physical feature when a valid horizontal feature is found.

Another aspect of the method of the present invention is that the desired physical feature comprises a top left intersection of a vertical and horizontal member of a cartridge cell within a tape library system.

Another aspect of the method of the present invention is that the method further includes using the position of the intersection relative to the imager to calibrate the physical position of the picker assembly.

In another embodiment of the present invention, an article of manufacture comprising a program storage medium readable by a computer is disclosed. The medium tangibly embodies one or more programs of instructions executable by the computer to perform a method for use in aligning a tape cartridge picker with cartridges in cells of a tape cartridge magazine, wherein the method includes illuminating an object with an illumination source, gathering image data for the illuminated object and processing the image data by using bounding boxes to identify the location of a desired physical feature in the thresholded image.

Another aspect of the article of manufacture of the present invention is that the processing the image data by using bounding boxes further includes finding a vertical feature of the desired physical feature by finding a valid vertical bounding box, determining whether a valid vertical feature is found, using the valid vertical feature as a reference point for the search for the horizontal feature and finding a valid horizontal bounding box of the desired physical feature when a vertical feature is positively identified, determining whether a valid horizontal feature is found and identifying a top-left intersection of the vertical and horizontal bounding boxes with the bottom-right corner of the desired physical feature when a valid horizontal feature is found.

Another aspect of the article of manufacture of the present invention is that the desired physical feature comprises a top left intersection of a vertical and horizontal member of a cartridge cell within a tape library system.

Another aspect of the article of manufacture of the present invention is that the article of manufacture further includes using the position of the intersection relative to the imager to calibrate the physical position of the picker assembly.

In another embodiment of the present invention, an imaging tape cartridge picker system for use in aligning a tape cartridge picker with cartridges in cells of a tape cartridge magazine is provided. The imaging tape cartridge picker assembly includes a picker assembly, illuminating means disposed at the front of the picker assembly for illuminating an object, imaging means disposed on the front of the picker assembly for gathering image data of the object and processing means, coupled to the imaging means and illuminating means, for thresholding the image data obtained from the imaging means and for controlling the illuminating means, wherein the processing uses bounding boxes to identify the location of a desired physical feature in the thresholded image.

Another aspect of the imaging tape cartridge picker system of the present invention is that the processing means identifies the location of the desired physical feature using the bounding boxes by finding a vertical feature of the desired physical feature by finding a valid vertical bounding box, determining whether a valid vertical feature is found, using the valid vertical feature as a reference point for the search for the horizontal feature and finding a valid horizontal bounding box of the desired physical feature when a vertical feature is positively identified, determining whether a valid horizontal feature is found and identifying a top-left intersection of the vertical and horizontal bounding boxes with the bottom-right corner of the desired physical feature when a valid horizontal feature is found.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention uses a dynamic thresholding method to actively search for the threshold value that produces the desired B/T ratio (i.e., ratio of black pixels to the total number of pixels is calculated) to delineate the relevant image attributes.

Figure 1:
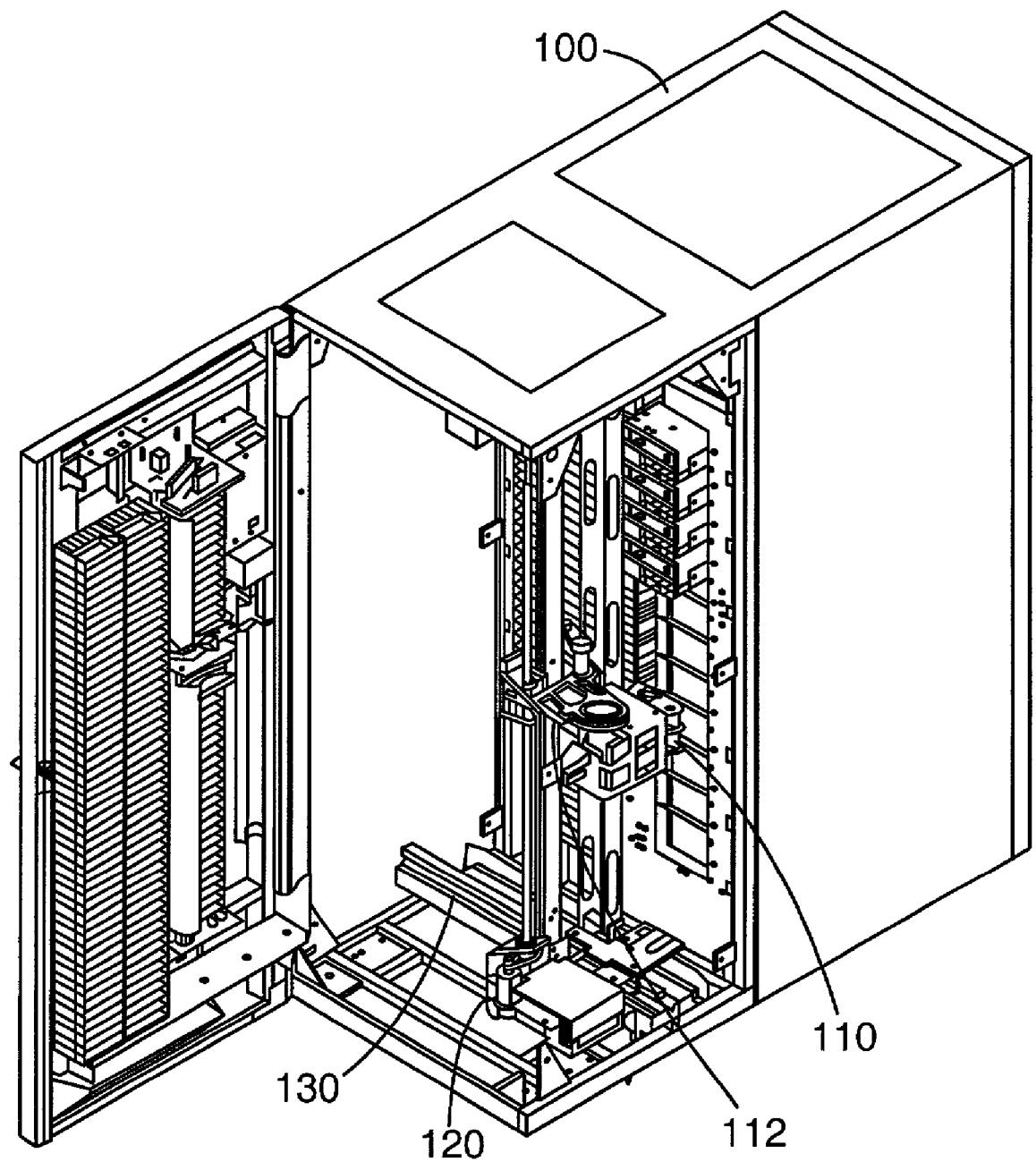
FIG. 1 illustrates an automatic tape library in accordance with the present invention.

FIG. 1 illustrates an automatic tape library system 100 in accordance with the present invention. As shown in FIG. 1, the tape library includes a dual gripper assembly 110 coupled to a gripper/picot assembly 112. The gripper assembly 110 moves in the y-axis along the y-axis assembly 120 and in the x-axis along the x-axis assembly 130.

Figure 2:
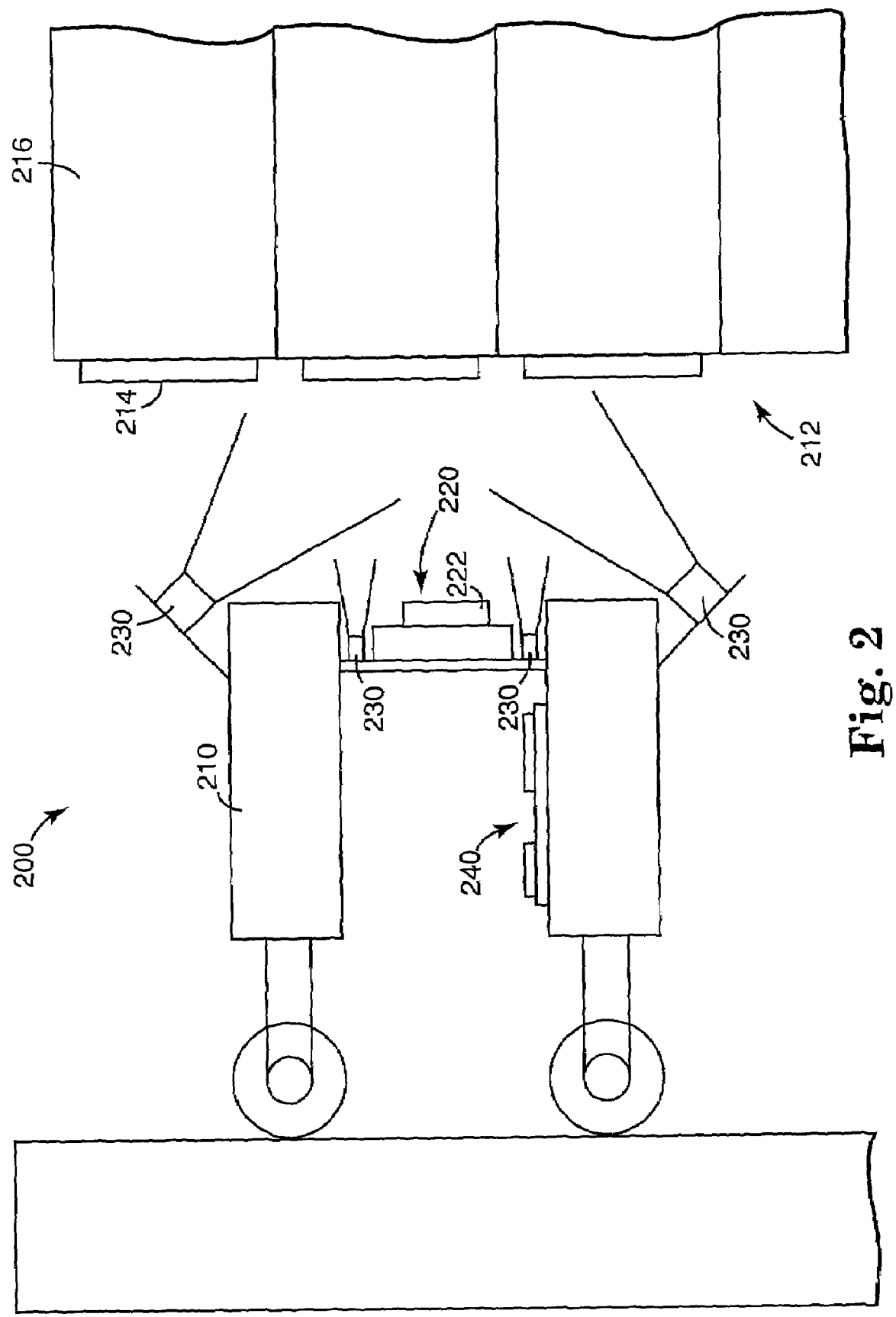
FIG. 2 illustrates an image based bar-code reading and robotic registration apparatus for use in automated tape library systems according to the present invention.

FIG. 2 illustrates an image-based bar code reading and robotic registration apparatus 200 for use in automated tape library systems according to the present invention. In FIG. 2, a picker assembly 210 is disposed along the outside of a cartridge magazine 212. The cartridge magazine 212 includes cartridges 214 in the cartridge cells 216. The picker 210 includes an imager 220, such as a camera (CCD, CMOS, etc.), positioned on the front of the picker assembly 210. The imager 220 includes appropriate optics 222 selected to filter out ambient light. Illumination 230 sources are disposed on the front of the picker 210. The imager 220 connects to a microprocessor or microcontroller 240 in its immediate vicinity. All image acquisition and processing are done by the imager 220 and microcontroller 240. To ensure operation independent of illumination variations, the image processing automatically adapts to dynamic lighting situations. Output format is dependent upon the host system, for example, a serial or Controller Area Network (CAN) bus. The imager 220 provides an inexpensive self-contained image processing system to visually verify the alignment of the picker 210 with the cartridges 214. Registration can be checked with every pick, greatly increasing reliability.

Figure 3:
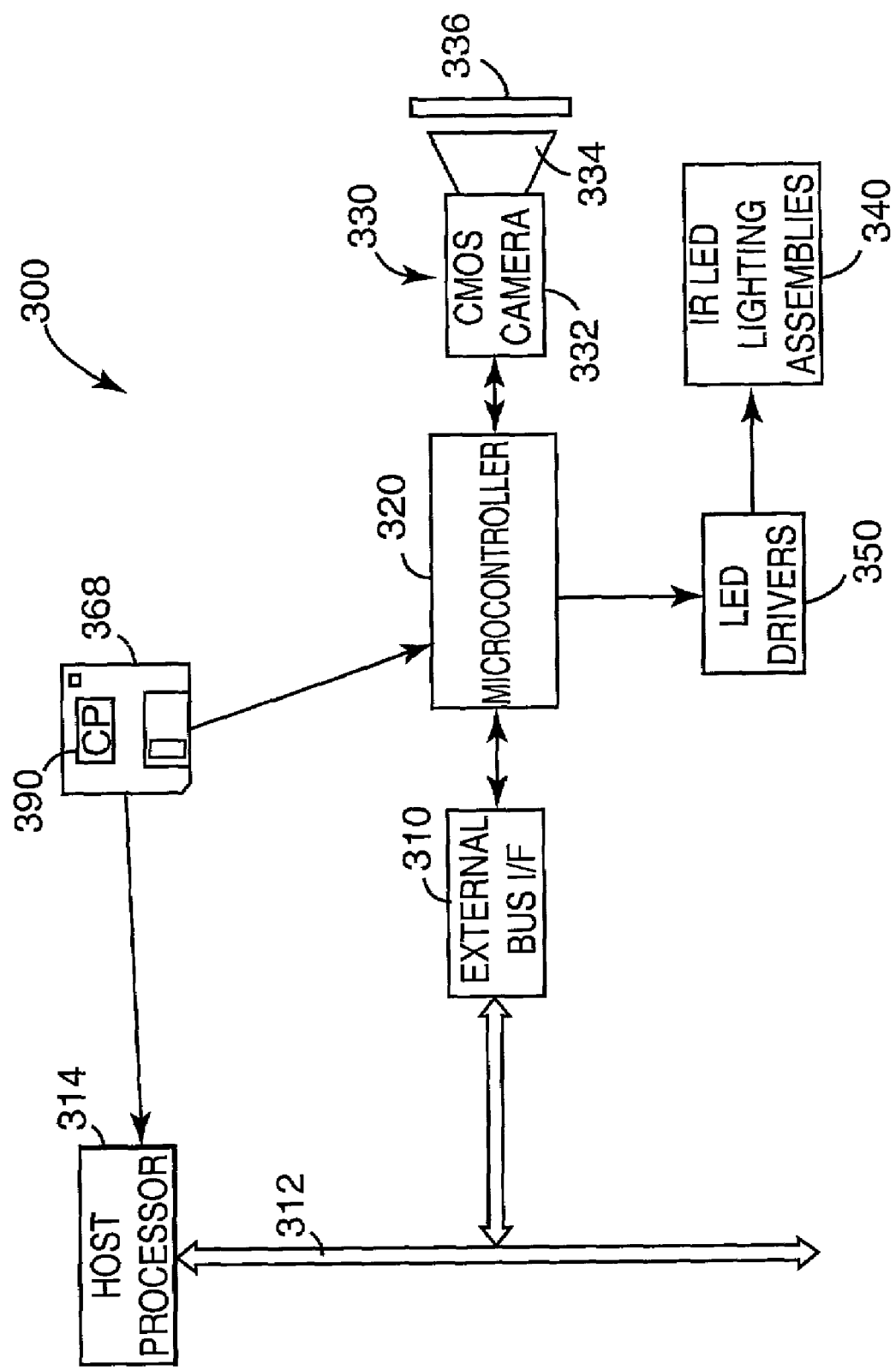
FIG. 3 illustrates a block diagram of the an image based bar-code reading and robotic registration apparatus for use in automated tape library systems according to the present invention.

FIG. 3 illustrates a block diagram 300 of an image based bar-code reading and robotic registration apparatus for use in automated tape library systems according to the present invention. An external bus interface 310 is coupled to an external communications bus 312. The external bus interface 310 is connected to a microcontroller 320. The microcontroller 320 controls both the imager 330 and the lighting assemblies 340. The microcontroller 320 provides the control signals to the camera 332 and lens assembly 334. An IR filter 336 may be provided at the lens of the imager.

The microcontroller 320 also drives LED drivers 350. The LED drivers 350 provide signals to the IR LED lighting assemblies 340. As discussed above, during operation, the lighting 340 mounted to the picker provides specular reflection off of the cartridge cells during calibration operations to allow cartridge registration.

The system 300 may also double as a bar-code reader thereby eliminating the need for a costly laser-based scanner. The image processing system 300 will operate as a finite-state-machine with two possible modes of operation. It can be either a bar-code reader or a registration sensor. The state of the system 300 determines the type of output it provides. As a bar-code reader, the system 300 outputs the values of bar codes to the external bus interface 310. As a registration sensor, the system 300 outputs an offset value of some detected image feature from its nominal location in the x, y plane to the external bus interface 310.

The system 300 uses imaging techniques by combining imagers 330 and inexpensive, yet powerful, microcontrollers 320. The entire system 300 is mounted on the picker assembly and is therefore completely self-contained. Calibration could be verified on every single pick operation, and a need for a separate bar-code scanner is eliminated, thus saving system cost. The present invention also increases product reliability because it continuously visually verifies the position of the picker thereby eliminating the need for time-consuming recalibration. During operation, the lighting 340 mounted to the picker provides specular reflection off of the cartridge cells during calibration operations. More diffuse lighting may be selected for bar-code reading.

To provide cartridge rack identification and tracking without modifying the mechanical cartridge/magazine system, a method is disclosed herein to identify the position of a cartridge rack within a tape library system with relation to the robotic accessor (picker). The method according to the present invention is intended to be included in the vision system is described above with reference to FIGS. 2–3.

The method according to the present invention provides the vision system with the ability to positively identify the position of the picker with relation to the cartridge rack without relying on special fiducial markings or other special target preparation. Instead, the method according to the present invention identifies key pre-existing elements of the cartridge slot features. Consequently, every cell can be calibrated, and no X-Y area is consumed for a fiducial mark, so cartridge storage can be maximally packed in a given wall area, which in turn maximizes library system storage capacity and simplifies magazine mold design.

Figure 4:
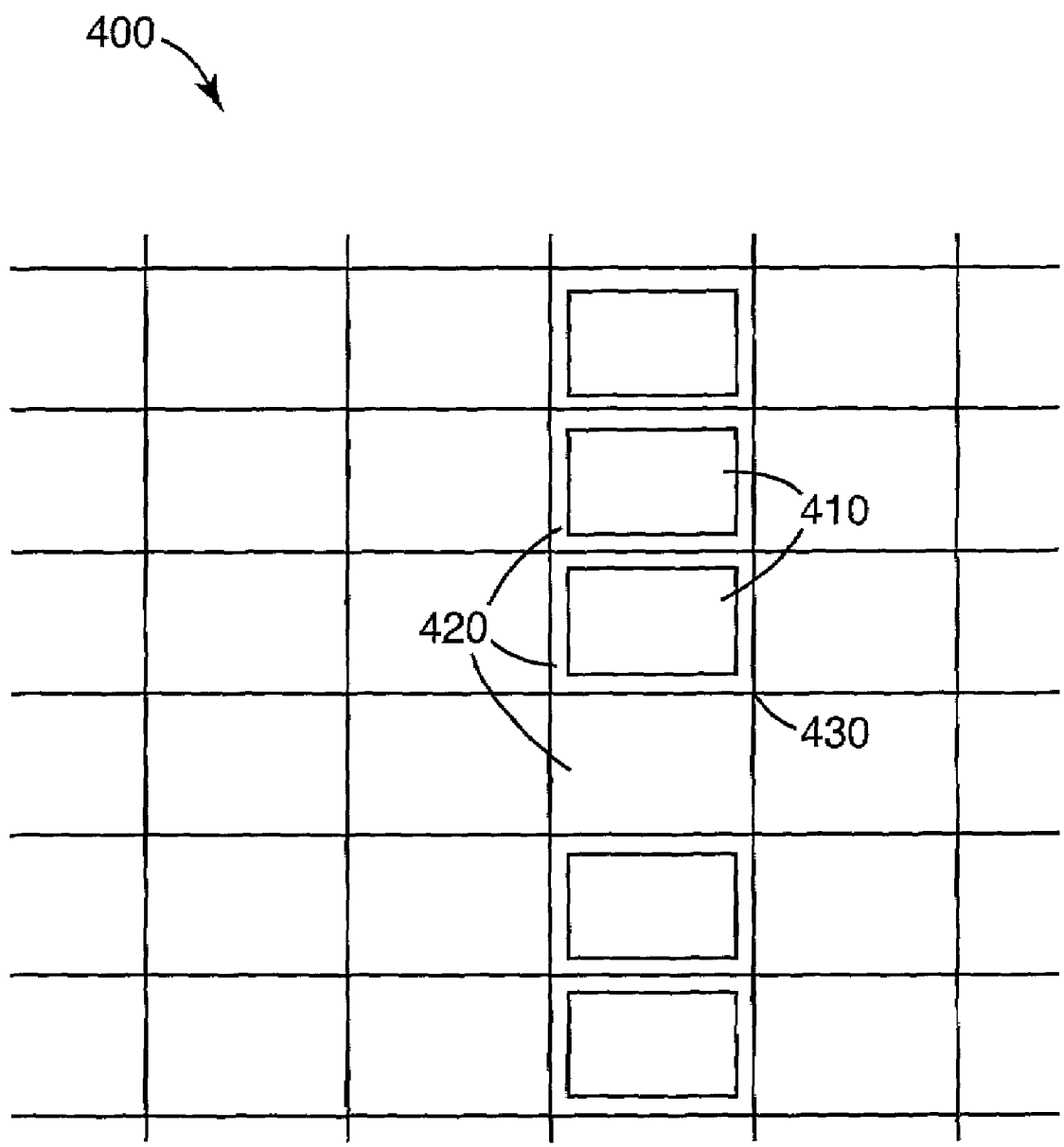
FIG. 4 illustrates a cartridge magazine.

FIG. 4 illustrates a cartridge magazine 400. In FIG. 4, the cartridge magazine 400 includes cartridge 410 disposed in cartridge cells 420. The method according to the present invention locates the lower right corner of the cell 420. In order to find position information without relying on special markings, the method according to the present invention identifies the intersection 430 of the horizontal and vertical members of the cartridge slots.

Figure 5:
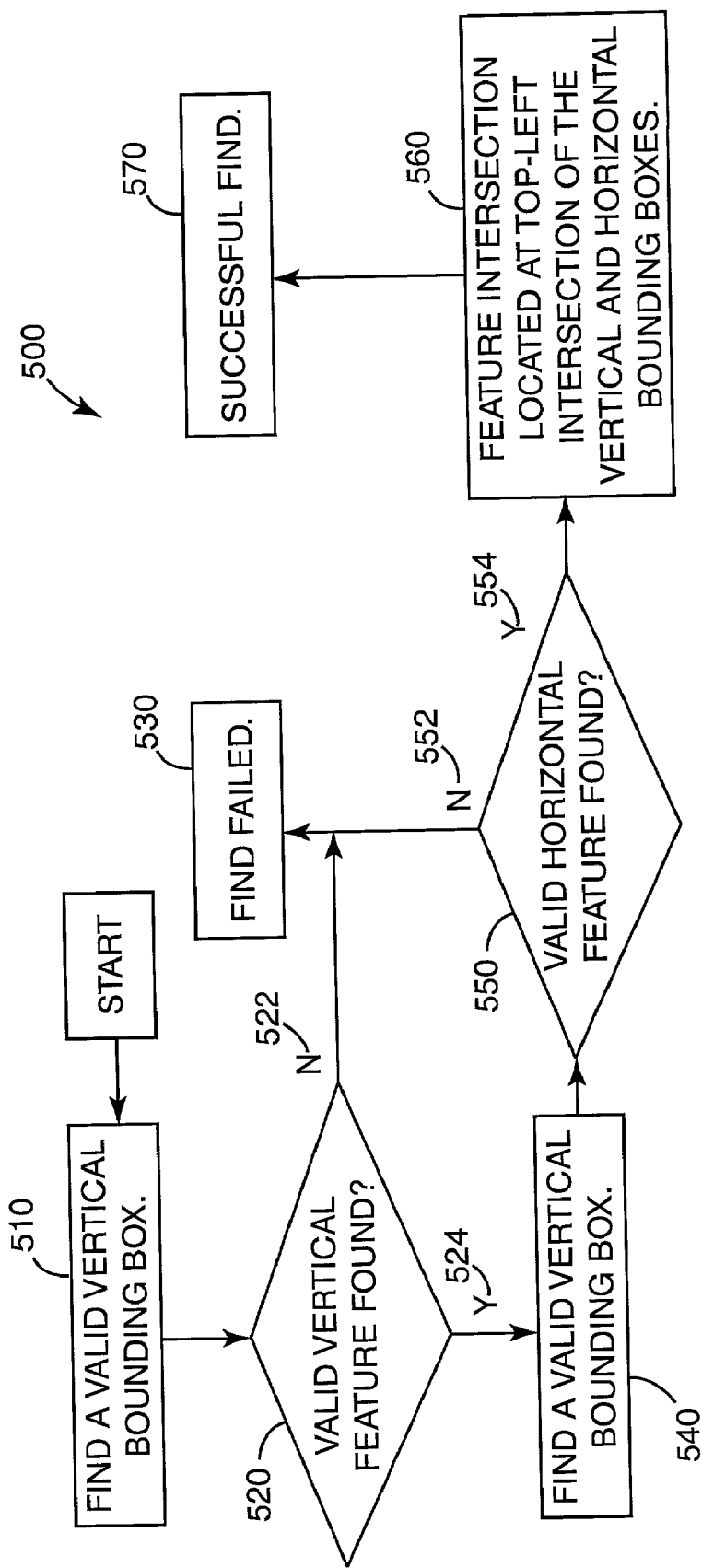
FIG. 5 illustrates a flow chart for identifying the position of the picker in relation to the cartridge rack.

FIG. 5 illustrates a flow chart 500 for identifying the position of the picker in relation to the cartridge rack. Bounding boxes are actively scanned across a thresholded image and grown around objects, wherein the growth behavior is dictated by the kind of shape (horizontal or vertical) that the bounding box is trying to emulate. The boxes are used as "dynamic templates." Because they share the same basic rectangular shape with the members of the cartridge rack, a bounding box that grows to fit the object in question will have the same position, size, and orientation as the object. Once a box is grown around an object, its size and position can be checked to see if it fits the template for the image feature being searched for.

The method first attempts to find the vertical feature. The first step is to find a valid vertical bounding box 510. A determination is made whether a valid vertical feature was found 520. If not 522, then the method failed 530. If a vertical feature is positively identified 524, then its position is used as a reference point for the search for the horizontal feature and a valid horizontal bounding box is sought 540. A determination is made whether a valid horizontal feature is found 550. If not 552, then the method failed 530. If a valid horizontal feature was found 554, both bounding boxes are found and the top-left intersection of the vertical and horizontal bounding boxes coincides with the bottom-right corner of the cartridge slot 560. The location of the intersection renders the method successful 570.

According to the present invention, the top left intersection of the vertical and horizontal members of a cartridge cell within a tape library system is sought. The position of this intersection relative to the imager mounted on a cartridge-retrieval robot is used to calibrate the physical position of the robotic system.

Two different images are used in finding the intersection. The first is the actual 8 bit gray-scale image. The second is a 1 bit binary image derived from the gray-scale image. The palettes used in this implementation are straightforward, In the 8 bit gray-scale image, 0 represents black, and a linear representation continues upward until 255, white, is reached. In the binary image, 1 (shown as black in the viewer functions) represents a value above the threshold level, and 0 (shown as white) represents a value below the threshold level. The bounding box intersection finder works with the binary image. The image is thresholded such that the important image attributes are visible.

Figure 7:
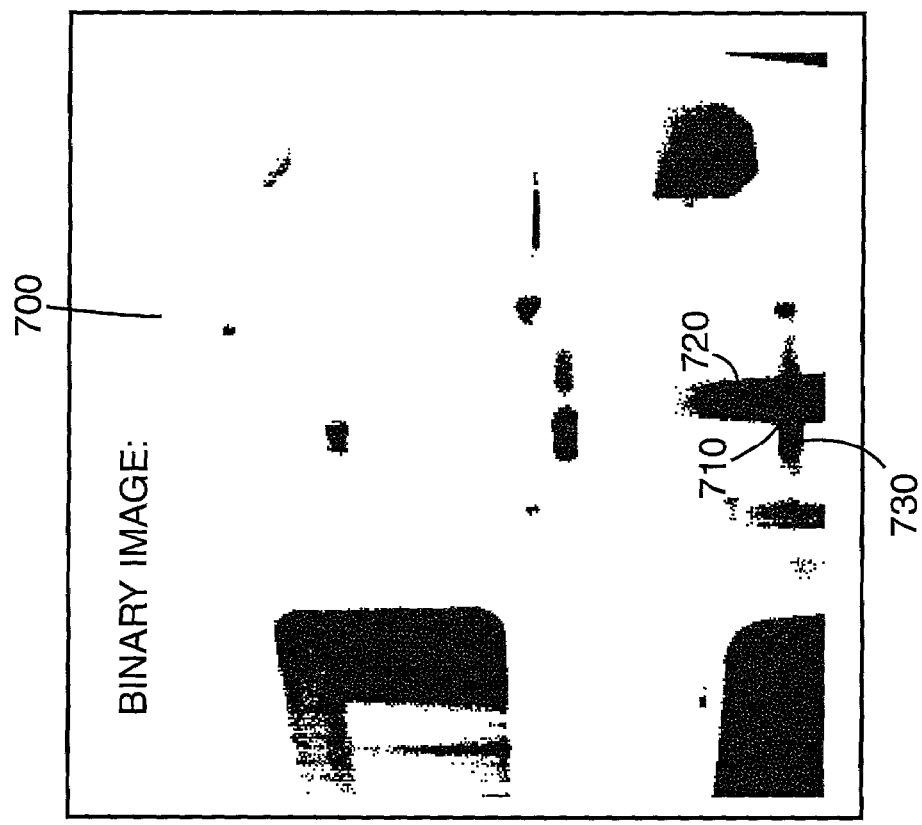
FIG. 7 illustrates a resulting binary image according to the present invention.
Figure 6:
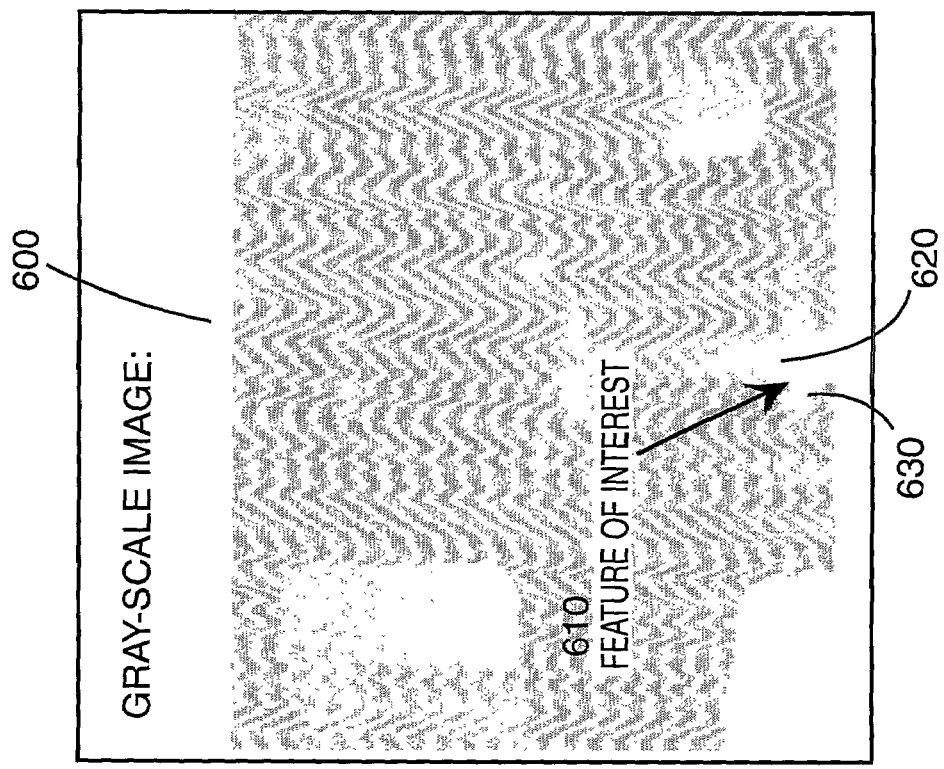
FIG. 6 illustrates a sample gray scale image obtained by the method of the present invention.

FIG. 6 illustrates a sample gray scale image 600 obtained by the method of the present invention. FIG. 7 illustrates a resulting binary image 700 obtained by the dynamic thresholding method. As stated earlier, the feature of interest is the top left hand corner 610, 710 of the intersection of the cartridge cell members. There is only one complete feature of this type visible in this binary image. Recognition of this feature is achieved using "bounding boxes." A first bounding box 620 is used to detect the vertical edge that forms the intersection, and a second bounding box 630 is used to detect the horizontal edge.

A bounding box is two sets of coordinates that define a rectangular area of the image. The primary function of the bounding box is to encompass an image attribute to determine its size and position. The bounding box could be described as a dynamic template. Its basic shape, a rectangle, is also the basic shape of the attribute it is searching for. When scanned across an image, it attempts to grow around, or "bound" every object it comes in contact with.

As described above with reference to FIG. 5, the method checks the size and shape of the box, along with its position, and attempts to determine whether or not it encompasses a valid feature. If it is, then the position and size of the feature is known because it corresponds to the dynamic template's size and location.

The rules that determine a bounding box's behavior begins at a single dark point, and then expanding the bounding box in size in both the x and y vectors. The direction of growth at any one time depends on the heuristics involved in searching for a particular feature as described more fully below. Simply put, the box will grow outwards in a specified direction as long as the ratio of dark-to-total pixels along the edge in that direction exceeds a preset threshold. After the box cannot grow anymore in either direction, it has bounded the object. The concept explained above is the same for all bounding boxes, although other rules can apply, depending on whether expansion is being performed for a horizontal or a vertical edge.

Figure 8:
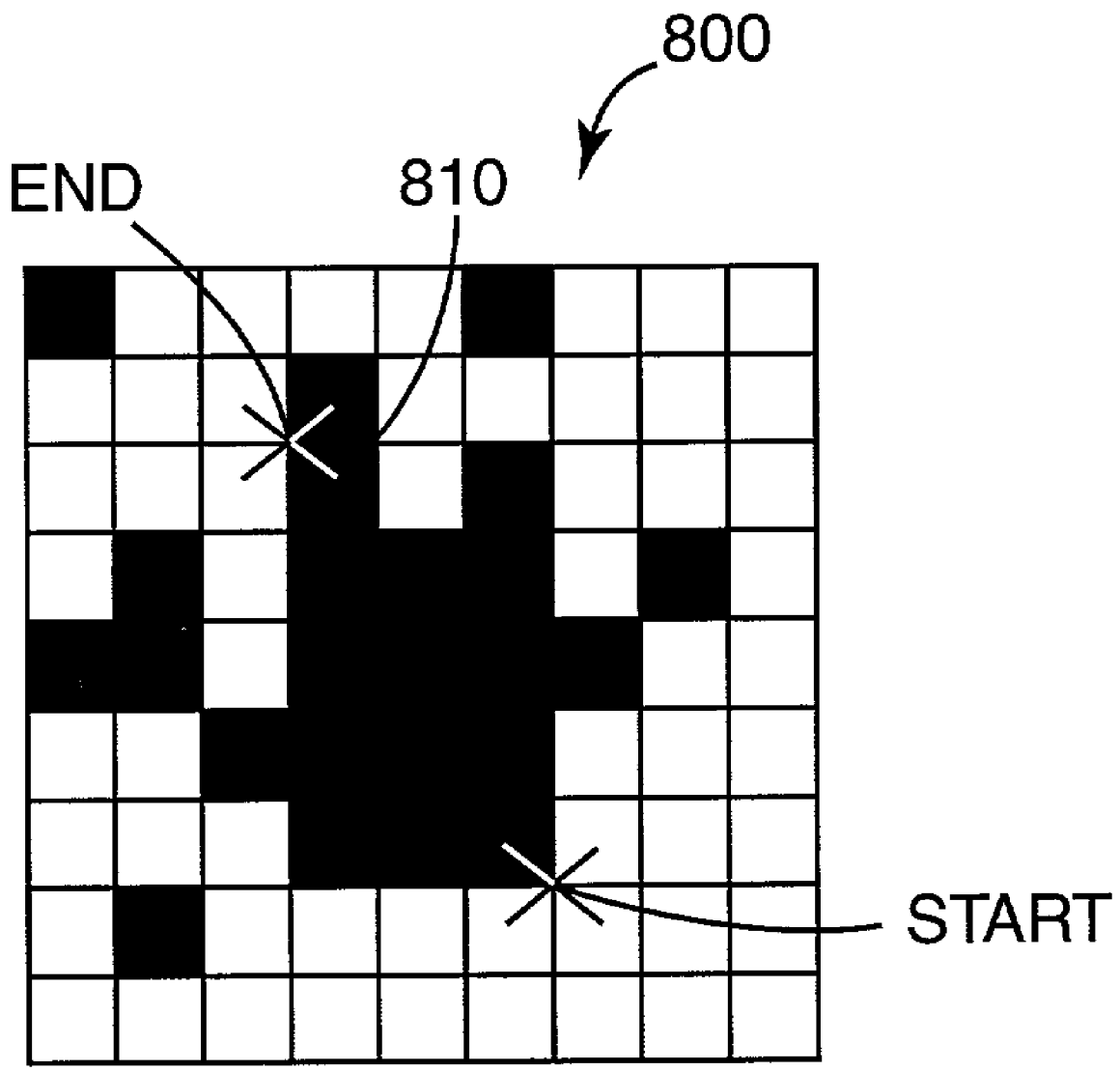
FIG. 8 illustrates an example of a bounding box according to the present invention.

FIG. 8 illustrates an example of a bounding box 800 according to the present invention. In this scenario, assume that the bounding box 800 is trying to grow up and to the left, and that it has a growing threshold of 0.65 for each direction. The top dimension 810 was allowed to grow even though a pixel was missing because the ratio, 2:3. or 0.66, is higher than the growth threshold of 0.65. The resulting bounding box is shown in gray. Whether or not this particular box represents the feature being searched for would depend upon whether or not its final dimensions match the attributes of the feature in question.

Figure 9:
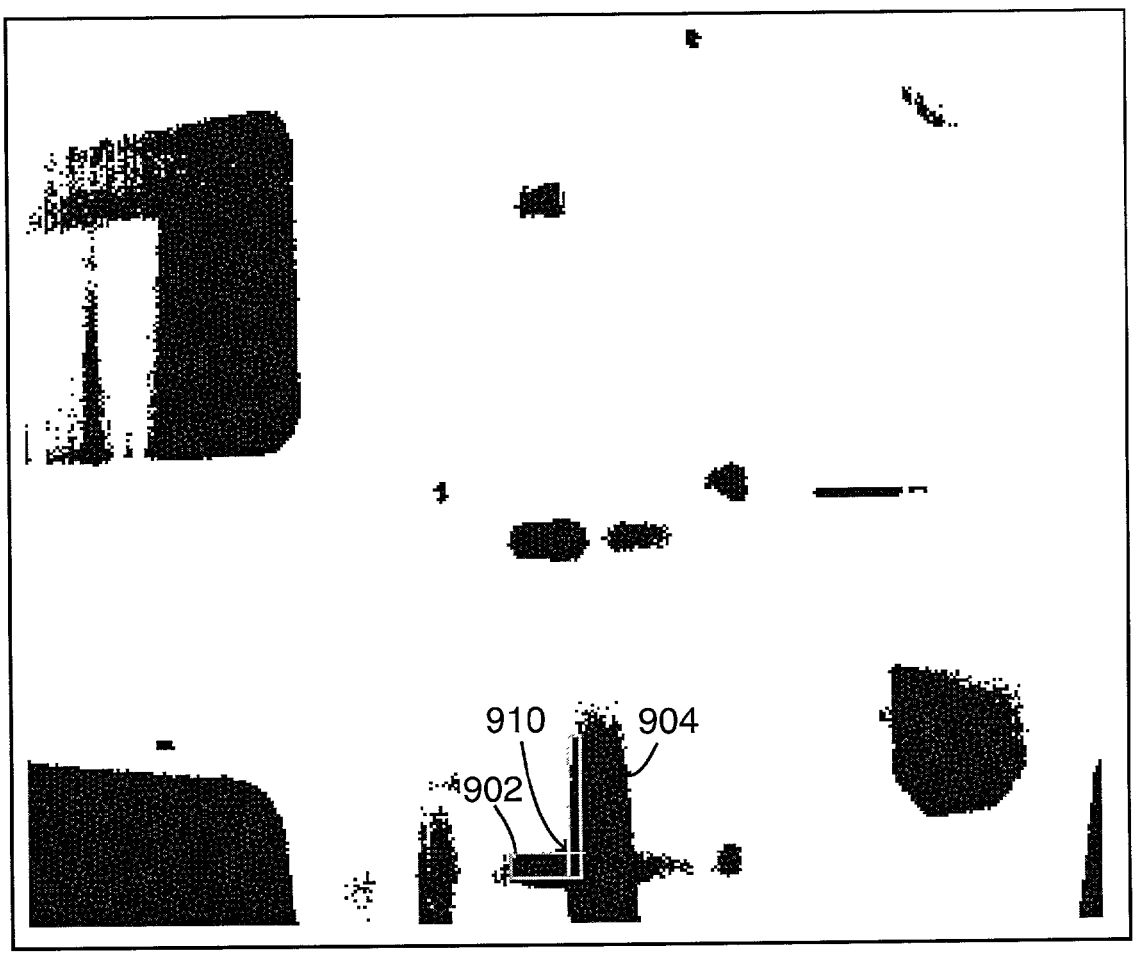
FIG. 9 illustrates the binary image of FIG. 7 after processing.

FIG. 9 illustrates the binary image of FIG. 7 after processing 900. In FIG. 9, the gray lines are the bounding boxes 902, 904, and the white "+" 910 shows the inferred feature location. As shown in FIG. 9, the boxes 902, 904 don't entirely encompass the object in question. Instead, the boxes 902, 904 start in the middle of the object. This is a result of the search and verification methods as explained below.

As stated earlier, the method of scanning a bounding box and determining whether or not the finished box is accepted as the correct feature, is dependent upon the feature in question. Taking for granted that these features, the horizontal and vertical edges of the cartridge rack, have been found successfully, then the sought intersection feature is located at the top left intersection 910 of the two bounding boxes 902, 904.

Figure 10:
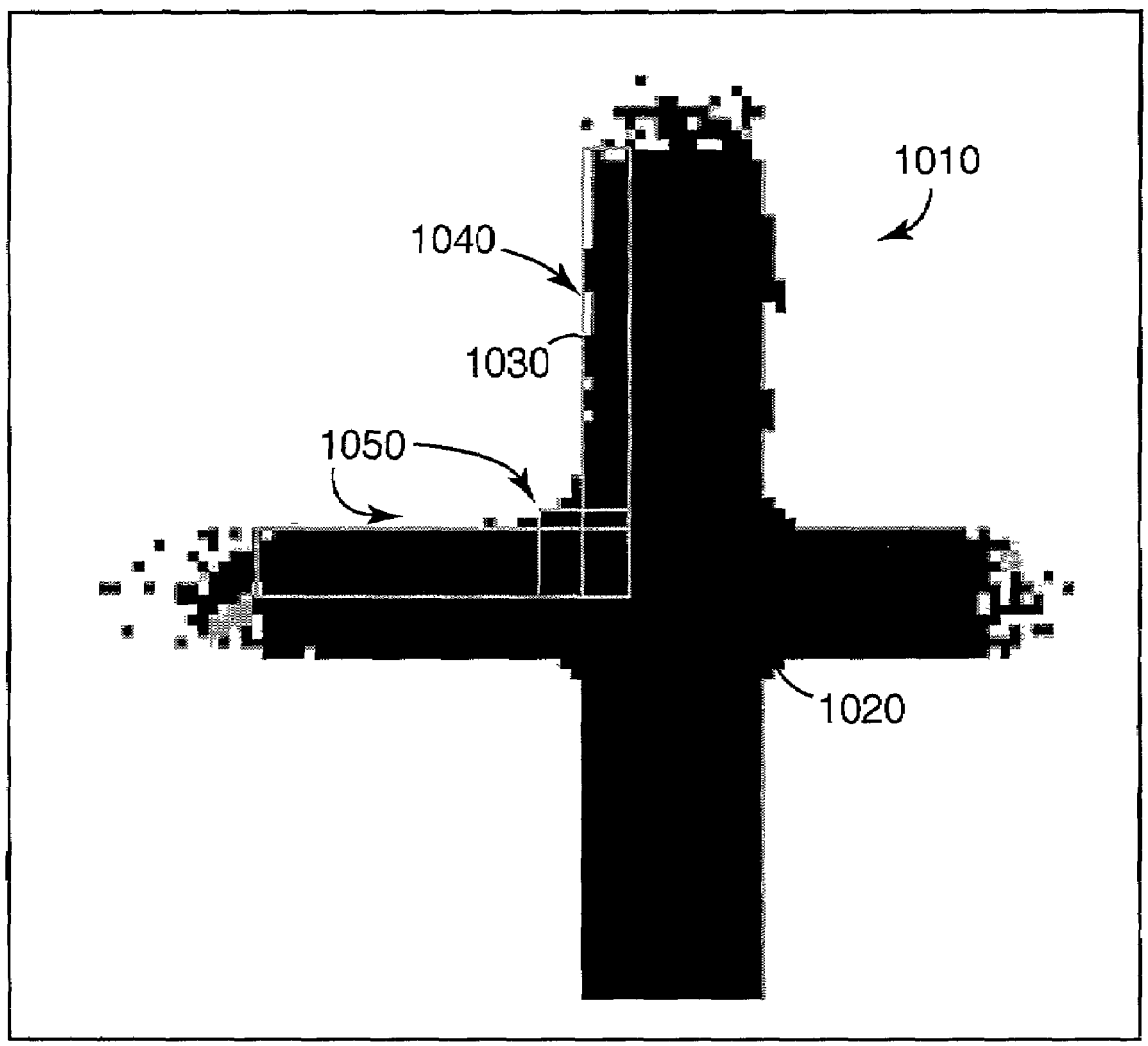
FIG. 10 illustrates the bounding box heuristics according to the present invention.

FIG. 10 illustrates the bounding box heuristics 1000 according to the present invention. In FIG. 10, the attention window 1010 is a rectangular area in an image represented by two coordinate points. It serves several purposes. It is essential for the operation of the dynamic thresholding method, and also increases the speed of the intersection-locating method. The attention window's 1010 name is self-explanatory. The space within the attention window 1010 is defined as an area in any particular image where the intersection 1020 is expected to appear. Because the intersection 1020 is expected to appear only within this window 1010, the code need only search within this space, reducing the amount of searching necessary and increasing execution speed. If the intersection 1020 is outside of the attention window 1010, then the method will fail. This is permissible because in the expected physical implementation of this system, the robot will be accurate enough to place the camera within acceptable tolerances of the expected position. Because the attention window 1010 will be defined based on the expected position of the intersection, the intersection 1020 should be within the attention window 1010 even if the robot is a bit out of calibration. If the intersection 1020 is located outside of the attention window 1010, the dynamic thresholding method has a high chance of failure, resulting in an invalid binary image.

To detect the vertical member 1030 of the cartridge cell, this method scans horizontally from the lower right side of the attention window 1010. Each time a dark pixel is detected, it grows a bounding box around the feature. After the box is grown, it is checked for validity, and then the search continues at the next pixel, regardless of the result of the validity check. After scanning across the whole attention window 1010, the last valid bounding box is considered the solution.

A bounding box for vertical features is grown up and to the left. It alternates between one of the two directions. First it grows up as far as it can. When it stops, it grows left as far as it can. When it cannot go any farther left, it tries to grow upwards again. The box alternates back and forth until it cannot grow in either direction 1040. Alternating in this manner prevents the box from getting stuck on blobs or extending into the horizontal cell member when the box is grown simultaneously in the x and y directions. With reference to FIG. 10, the leftmost valid box 1050 is grown with simultaneous x and y and would not have been accepted as a valid box because it was grown incorrectly. Box 1040 was grown with alternating x and y and represents a valid box.

Figure 11:
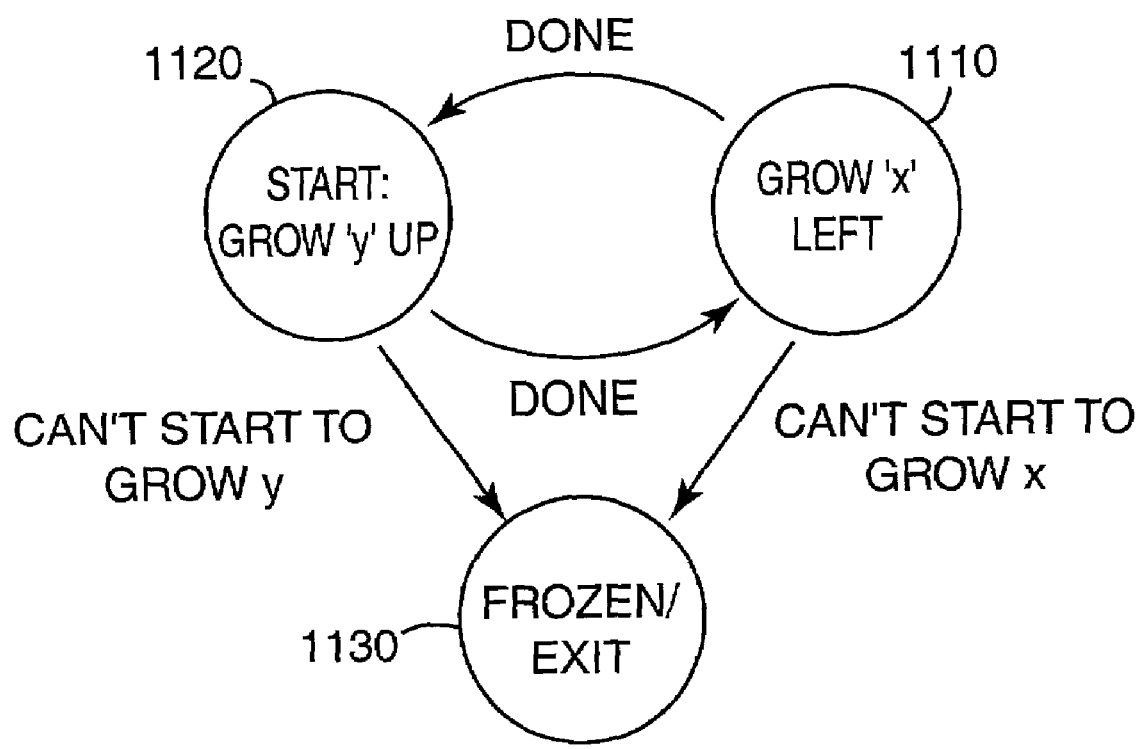
FIG. 11 shows a state diagram for the box bounding method according to the present invention.

In order to grow the box in an alternating fashion, the bounding method is set up as a finite-state-machine. FIG. 11 shows a state diagram 1100 for the box bounding method according to the present invention. There are two states for growth: one grows the x-axis 1110 and the other grows the y-axis 1120. A third state 1130 is entered when no more growth is possible, from which point the method is finished growing the box:

As can be seen in FIG. 9 shown previously, there is a high probability that the adjacent vertical cell members will be "smudged" together. By scanning across the object and considering it several times, another behavior emerges: left edge detection.

Figure 12A:
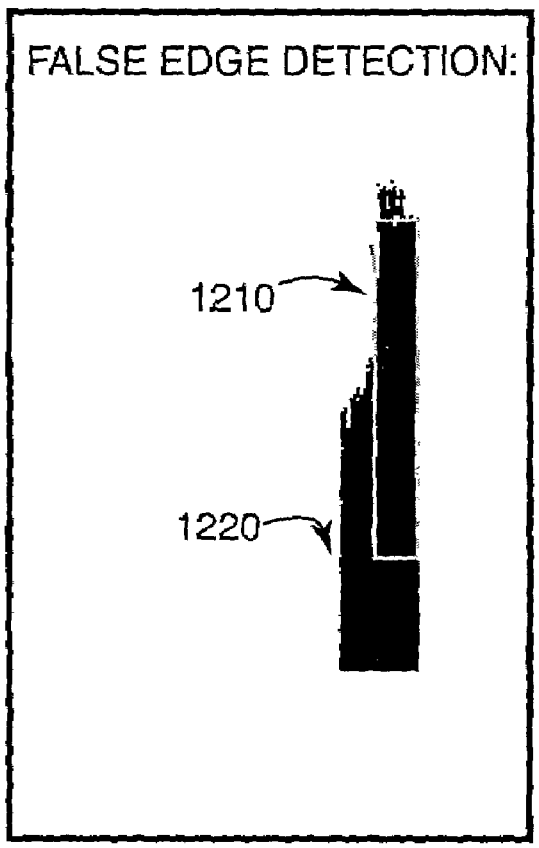
FIGS. 12a–b illustrate edge detection according to the present invention.
Figure 12B:
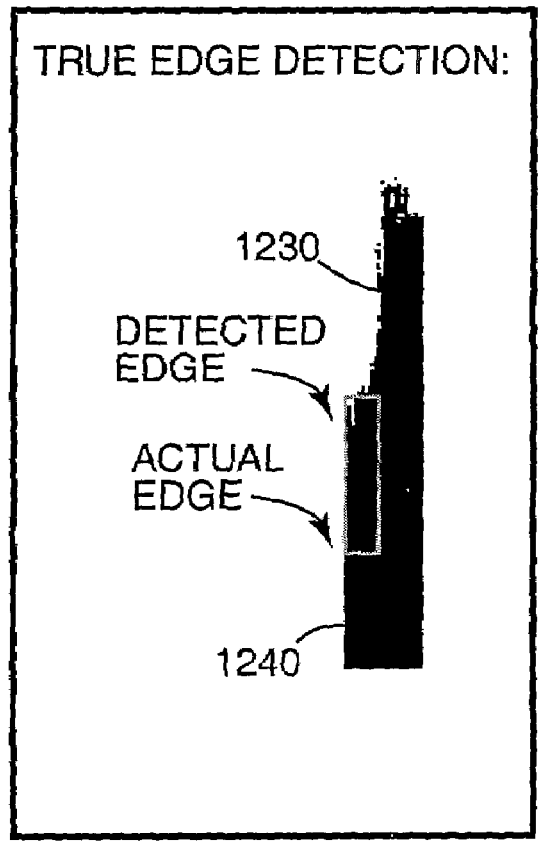

FIGS. 12*a*–*b* illustrate edge detection 1200 according to the present invention. There is always the possibility that non-uniform lighting will cause a nonexistent "shaft" 1210 to extend from the right side of the vertical member. In this case, the bounding box shoots up the shaft and never finds the true edge 1220. If the method scans across the object and checks several times, moving to the left and accepting the leftmost box as valid, then even if it does go up a shaft 1230 it will continue, eventually considering and accepting the true left edge 1240. Because the method searches for the bottom right corner of the member intersection, the leftmost column 1240 will be the one that belongs to the correct object.

Figure 13:
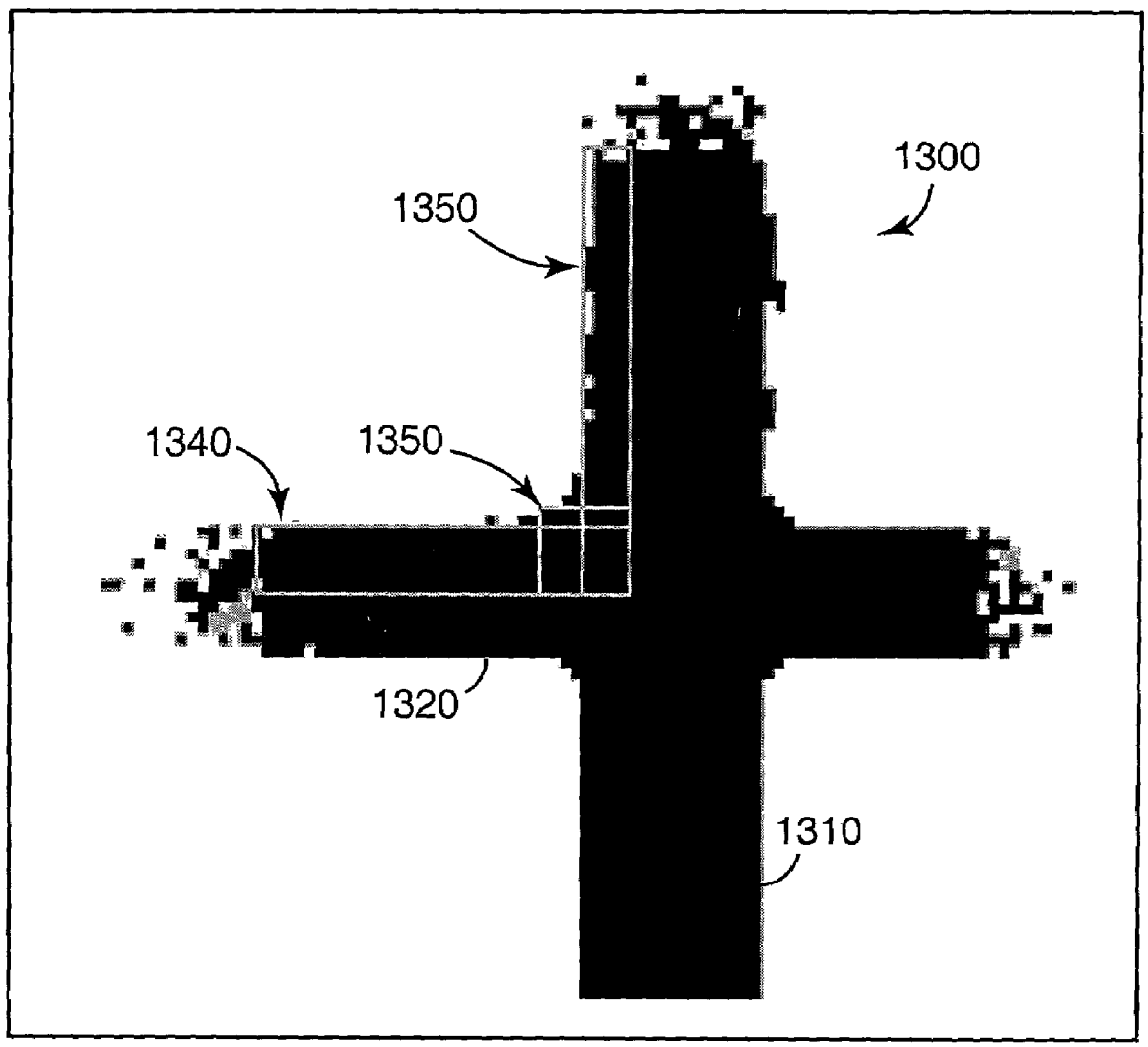
FIG. 13 illustrates horizontal box detection according to the present invention.

FIG. 13 illustrates horizontal box detection 1300 according to the present invention. The horizontal box scan starts at the bottom right corner of the validated vertical box 1310 and scans upwards in the same manner in which the vertical box scan scans across. Like the vertical box, the horizontal box is grown by alternating between up and left 1340, but the initial growth is left instead of up. Again, a box 1350 grown simultaneously in the x and y directions would get stuck on blobs or extend into the vertical cell member 1350, which is why growth is not performed in this manner.

Unlike in the vertical box scan, the first validated horizontal box 1320 is accepted and then the routine exits. This is acceptable because the lighting is more predictable along this axis, and the horizontal cell members are physically far apart. Nevertheless, scanning over the entire object can also been used, and could be implemented if problems with edge detection are later discovered. Care must be taken that the attention window is placed such that the desired intersection will be the one recognized by the heuristics used. For instance, with the current method, the intersection must be the lowest one within the attention window because that is the one the method will detect.

The box growing routine will grow first to the left, and then up, because of the nature of the object it is searching for. The bounding box starts in the vertical cell member and grows left into the horizontal member. By allowing the x direction to grow first, the box will shoot out into any horizontal attribute, and the y direction can grow out to measure the attribute's size.

Figure 14:
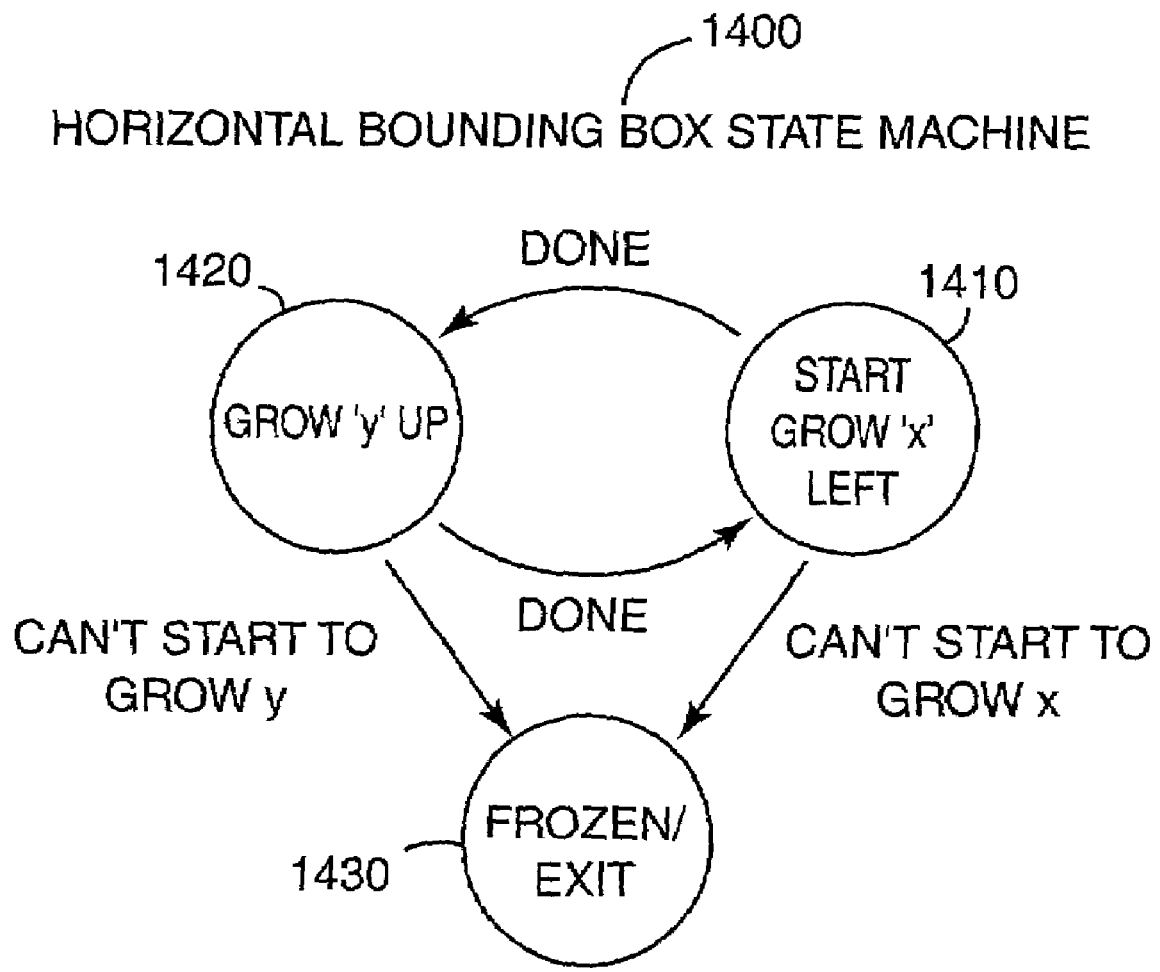
FIG. 14 illustrates the state diagram for the horizontal bounding box finite-state-machine.

FIG. 14 illustrates the state diagram 1400 for the horizontal bounding box finite-state-machine. The state diagram 1400 is identical to the vertical one 1100 of FIG. 11 except the initial state is "Grow 'x' left" 1410 instead of "Grow 'y' UP" 1420. Again, the third state 1430 is entered when the method can not grow in either the x or y direction.

Referring again to FIG. 3, an image based bar-code reading and robotic registration system 300 according to the present invention is shown, wherein the process illustrated with reference to FIGS. 5–14 above may be tangibly embodied in a computer-readable medium or carrier, e.g. one or more of the fixed and/or removable data storage devices 368 illustrated in FIG. 3, or other data storage or data communications devices. A computer program 390 expressing the processes embodied on the removable data storage devices 368 may be loaded into the microcontroller 320 or into a processor 314 coupled to the external communications bus 312 to configure the microcontroller 320 or host processor 314 of FIG. 3, for execution. The computer program 390 comprise instructions which, when read and executed by the microcontroller 320 or host processor 314 of FIG. 3, causes the microcontroller 320 or host processor 314 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An imaging tape cartridge picker system for use in aligning a tape cartridge picker with cartridges in cells of a tape cartridge magazine, comprising:
   a picker assembly;
   illumination sources disposed at the front of the picker assembly for illuminating an object;
   an imager disposed on the front of the picker assembly for gathering image data of the object; and
   a processor, coupled to the imager and illumination sources, for thresholding the image data obtained from the imager and for controlling the illumination sources;
   wherein the processor uses bounding boxes to identify the location of a desired physical feature in the thresholded image.

2. The imaging tape cartridge picker system of claim 1 wherein the processor identifies the location of the desired physical feature using the bounding boxes by finding a vertical feature of the desired physical feature by finding a valid vertical bounding box, determining whether a valid vertical feature is found, using the valid vertical feature as a reference point for the search for the horizontal feature and finding a valid horizontal bounding box of the desired physical feature when a vertical feature is positively identified, determining whether a valid horizontal feature is found and identifying a top-left intersection of the vertical and horizontal bounding boxes with the bottom-right corner of the desired physical feature when a valid horizontal feature is found.

3. The imaging tape cartridge picker system of claim 2 wherein the desired physical feature comprises a top left intersection in a bottom-right corner of a vertical and horizontal member of a cartridge cell within a tape library system.

4. The imaging tape cartridge picker system of claim 3 wherein the position of the intersection relative to the imager is used to calibrate the physical position of the picker assembly.

5. The imaging tape cartridge picker system of claim 1 wherein the desired physical feature comprises a top left intersection of a vertical and horizontal member of a cartridge cell within a tape library system.

6. The imaging tape cartridge picker system of claim 5 wherein the position of the intersection relative to the imager is used to calibrate the physical position of the picker assembly.

7. A method for use in aligning a tape cartridge picker with cartridges in cells of a tape cartridge magazine, comprising:
   illuminating an object with an illumination source;

gathering image data for the illuminated object;
thresholding the image data; and
processing the thresholded image data by using bounding boxes to identify the location of a desired physical feature in the thresholded image data;
wherein the desired physical feature comprises a top left intersection of a vertical and horizontal member of a cartridge cell within a tape library system.

8. The method of claim 7 wherein the processing the image data by using bounding boxes further comprises:
finding a vertical feature of the desired physical feature by finding a valid vertical bounding box;
determining whether a valid vertical feature is found;
using the valid vertical feature as a reference point for the search for the horizontal feature and finding a valid horizontal bounding box of the desired physical feature when a vertical feature is positively identified;
determining whether a valid horizontal feature is found; and
identifying a top-left intersection of the vertical and horizontal bounding boxes with the bottom-right corner of the desired physical feature when a valid horizontal feature is found.

9. The method of claim 8 wherein the desired physical feature comprises a top left intersection of a vertical and horizontal member of a cartridge cell within a tape library system.

10. The method of claim 9 further comprising using the position of the intersection relative to the imager to calibrate the physical position of the picker assembly.

11. The method of claim 7 further comprising using the position of the intersection relative to the imager to calibrate the physical position of the picker assembly.

12. An article of manufacture comprising a program storage medium readable by a computer, the medium tangibly embodying one or more programs of instructions executable by the computer to perform a method for use in aligning a tape cartridge picker with cartridges in cells of a tape cartridge magazine, the method comprising:
illuminating an object with an illumination source;
gathering image data for the illuminated object;
thresholding the image data; and
processing the thresholded image data by using bounding boxes to identify the location of a desired physical feature in the thresholded image data;
wherein the desired physical feature comprises a top left intersection of a vertical and horizontal member of a cartridge cell within a tape library system.

13. The article of manufacture of claim 12 wherein the processing the image data by using bounding boxes further comprises:
finding a vertical feature of the desired physical feature by finding a valid vertical bounding box;
determining whether a valid vertical feature is found;
using the valid vertical feature as a reference point for the search for the horizontal feature and finding a valid horizontal bounding box of the desired physical feature when a vertical feature is positively identified;
determining whether a valid horizontal feature is found; and
identifying a top-left intersection of the vertical and horizontal bounding boxes with the bottom-right corner of the desired physical feature when a valid horizontal feature is found.

14. The article of manufacture of claim 13 wherein the desired physical feature comprises a top left intersection of a vertical and horizontal member of a cartridge cell within a tape library system.

15. The article of manufacture of claim 14 further comprising using the position of the intersection relative to the imager to calibrate the physical position of the picker assembly.

16. The article of manufacture of claim 12 further comprising using the position of the intersection relative to the imager to calibrate the physical position of the picker assembly.

17. An imaging tape cartridge picker system for use in aligning a tape cartridge picker with cartridges in cells of a tape cartridge magazine, comprising:
a picker assembly;
illuminating means disposed at the front of the picker assembly for illuminating an object;
imaging means disposed on the front of the picker assembly for gathering image data of the object; and
processing means, coupled to the imaging means and illuminating means, for thresholding the image data obtained from the imaging means and for controlling the illuminating means;
wherein the processing uses bounding boxes to identify the location of a desired physical feature in the thresholded image.

18. The imaging tape cartridge picker system of claim 17 wherein the processing means identifies the location of the desired physical feature using the bounding boxes by finding a vertical feature of the desired physical feature by finding a valid vertical bounding box, determining whether a valid vertical feature is found, using the valid vertical feature as a reference point for the search for the horizontal feature and finding a valid horizontal bounding box of the desired physical feature when a vertical feature is positively identified, determining whether a valid horizontal feature is found and identifying a top-left intersection of the vertical and horizontal bounding boxes with the bottom-right corner of the desired physical feature when a valid horizontal feature is found.

19. The imaging tape cartridge picker system of claim 18 wherein the desired physical feature comprises a top left intersection of a vertical and horizontal member of a cartridge cell within a tape library system.

20. The imaging tape cartridge picker system of claim 19 wherein the position of the intersection relative to the imager is used to calibrate the physical position of the picker assembly.

21. The imaging tape cartridge picker system of claim 17 wherein the desired physical feature comprises a top left intersection of a vertical and horizontal member of a cartridge cell within a tape library system.

22. The imaging tape cartridge picker system of claim 21 wherein the position of the intersection relative to the imager is used to calibrate the physical position of the picker assembly.

* * * * *